Figure 1:
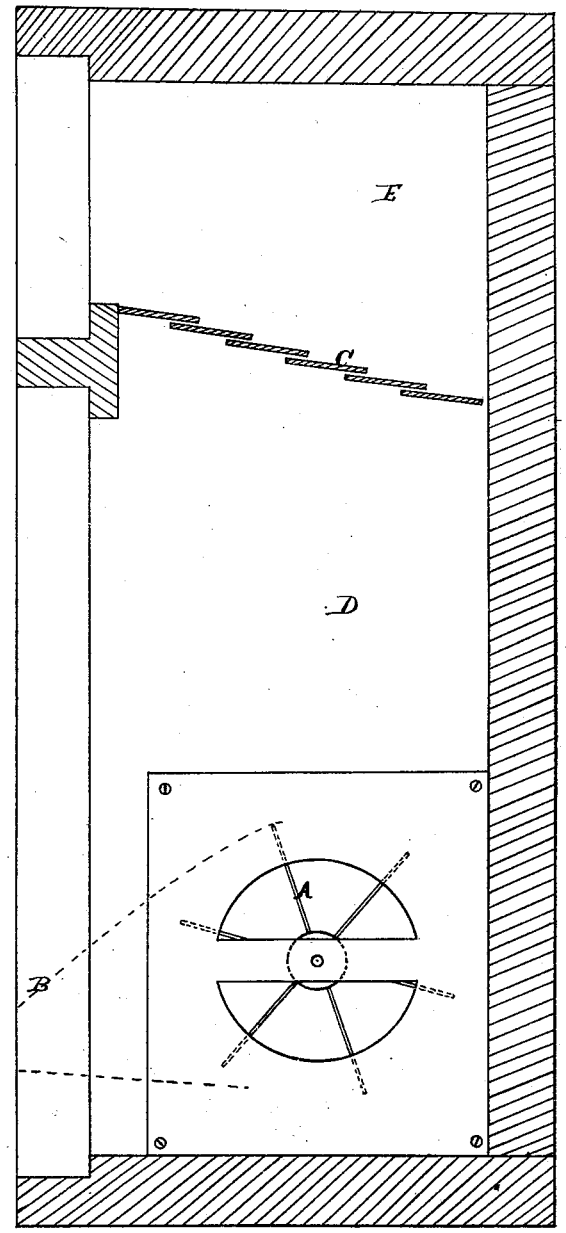

M. H. HALL.
Refrigerators.

No. 149,303. Patented April 7, 1874.

Witnesses:
Wm. Henry Clifford.
Frank H. Jordan.

Inventor:
Michael H. Hall

UNITED STATES PATENT OFFICE.

MICHAEL H. HALL, OF PORTLAND, MAINE.

IMPROVEMENT IN REFRIGERATORS.

Specification forming part of Letters Patent No. 149,303, dated April 7, 1874; application filed May 1, 1873.

*To all whom it may concern:*

Be it known that I, MICHAEL H. HALL, of Portland, in the county of Cumberland and State of Maine, have invented certain new and useful Improvements in Refrigerators; and I do hereby declare that the following is a full, clear, and exact description thereof, that will enable others skilled in the art to which it appertains to make and use the same, reference being had to the accompanying drawings and to the letters of reference marked thereon, which form a part of this specification.

In the drawing is shown a vertical section, showing an ice-shelf, the fan, and its manner of communication with the interior of the safe and the outer air.

A shows the fan. B indicates the communication therefrom with the open air. C shows the ice-shelf; D, the preserving-compartment; E, the cooling-compartment.

My invention relates to the employment of a fan or blower constructed to rotate within a suitable box or chamber connected with the preserving-compartment of ice-safes or refrigerators, and arranged to operate in such manner that the contained air within such preserving-compartment may, at any time required, be expelled or forced out, and be replaced by fresh, pure, dry air drawn by this means through the ice or cooling chamber of the refrigerator. The object of my invention is to secure and maintain within the preserving-compartments of ice-safes or refrigerators the lowest possible temperature, and the abstraction of moisture from the contained air, and to counteract the injurious effects produced by frequent changes of temperature and the introduction of the warm moist external air into said compartments by the necessary opening and closing of the doors thereto; these results being secured by my invention, which, the moment the doors are closed, expels the warm moist air so admitted, and instantly reproduces the same dry cold atmosphere existing there before the doors were opened.

It is now generally understood that a dry condition of the atmosphere is necessary to prevent decomposition, low temperature to prevent evaporation, while the maintenance or preservation of an even temperature, and continued absence of moisture, are absolutely essential for the preservation of all articles of food, either solid or liquid; and the application of the principles involved in my invention will, I claim, produce these results.

I prefer that the receptacle for ice or other cooling substances employed shall be in the upper part or portion of the ice-safe or refrigerator, or at an elevation greater than the top of the apartment designed for containing the articles to be preserved; that the ice-chamber shall be so constructed that the air shall have free passage through it to the preserving-compartment; that the walls of the refrigerator shall be made or composed of the best non-conducting materials; that openings shall be made at the top, or near the top, of the ice-chamber for the ingress of the outer air, and similar openings made at or near the bottom of the preserving-compartment for the egress of the air, so that there may be at all times a natural but slow circulation of air from the ice-chamber to and through such preserving-compartment. The doors should be made to close as nearly air-tight as possible.

The fan or blower which I propose to employ in connection with the preserving-compartments of ice-safes or refrigerators will be made to rotate within a chamber or box situated, by preference, at or near the bottom of such preserving-compartment, and opening into it, and also having a discharge-opening leading through the walls of the refrigerator to the outer air. This discharge-opening should be provided with a valve, so arranged that while it shall prevent the ingress of the outer air, it shall offer no obstruction to the expulsion of the air from the interior of the safe when the fan or blower is in motion. Thus, when the fan or blower so arranged is set in motion, the air contained within the preserving-compartment is rapidly expelled through the discharge-opening above mentioned, while its place is at the same time supplied with air drawn over and through the ice contained in the ice-chamber, where its temperature is reduced, and its moisture extracted or removed. By the same operation the moisture deposited upon articles of food within the preserving-compartment by condensation from the warmer moist air admitted by opening the doors thereto is instantaneously absorbed and removed by the current of dry cold air thus produced.

To secure the best results, the fan or blower should always be operated for a brief time immediately after each closing of the doors of the preserving-compartment, for the purposes above mentioned; and in cases where such doors remain closed for any considerable time, the fan or blower should also be operated occasionally, to induce and secure a fresh supply of dry cold air within.

The said fan or blower may be made to operate automatically by clock-work driven by springs or weights wound up by opening the door, or by the weight of the drip of water from the melting ice above; or it may be driven by a crank and belt or other mechanical contrivances placed upon the outside of the safe or refrigerator.

I am aware of Letters Patent to W. Bray, September 15, 1868, D. E. Somes, January 25, 1870, and A. Booth, September 13, 1870. I do not claim a rotary fan or other mechanical device, broadly, as applied to refrigerators; nor a blower, in combination with a cooling-chamber, an interior chamber, and an ice-receptacle. Neither do I claim a series of air-tight ice-receptacles, in combination with a deflecting-plate, fan, air-chamber, and discharge-pipes. My invention has in view such an arrangement of a rotary fan in a refrigerating-box between the outer and inner walls thereof, that on every occasion when the door of the said receptacle is opened, and warm air admitted and the door closed, the rotation of the said fan will draw out of the refrigerating-box the warm air thus admitted, and so compel the new air, which enters to supply the place of the air expelled, to pass over or through the ice contained in the refrigerator. Thus my invention has for its object to instantly cool again the atmosphere of a refrigerator when the temperature has been raised by the opening of the door.

Having thus specifically described the construction and operation of my invention, what I claim as new, and desire to secure by Letters Patent, is—

The arrangement of the rotary fan between the outer and inner walls of a refrigerator, as herein shown and described, to remove the warmer air from the interior of the receptacle after the opening and closing of the door thereof, as herein set forth.

In testimony that I claim the foregoing, I have hereunto set my hand this 28th day of April, 1873.

MICHAEL H. HALL.

Witnesses:
WM. HENRY CLIFFORD,
FRANK H. JORDAN.